W. A. Shaw,

Bottle Stopper.

No. 1,576. Reissued Nov. 24, 1863.

Witnesses:
W. B. Crosby
Geo Phippen

Inventor:
William A. Shaw

UNITED STATES PATENT OFFICE.

WILLIAM A. SHAW, OF BOSTON, MASSACHUSETTS.

IMPROVEMENT IN BOTTLES AND BOTTLE-STOPPERS.

Specification forming part of Letters Patent No. 2,960. dated December 17, 1861; Reissue No. 1,576, dated November 24, 1863.

*To all whom it may concern:*

Be it known that I, WILLIAM A. SHAW, of Boston, in the county of Suffolk and State of Massachusetts, have invented certain new and useful Improvements in Stopping Bottles and other Similar Articles, of which the following is a clear, full, and exact description, reference being had to the accompanying drawings, making part of this description, in which—

Figure 3:
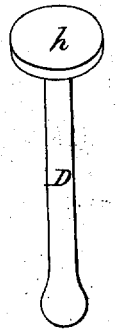
Figure 2:
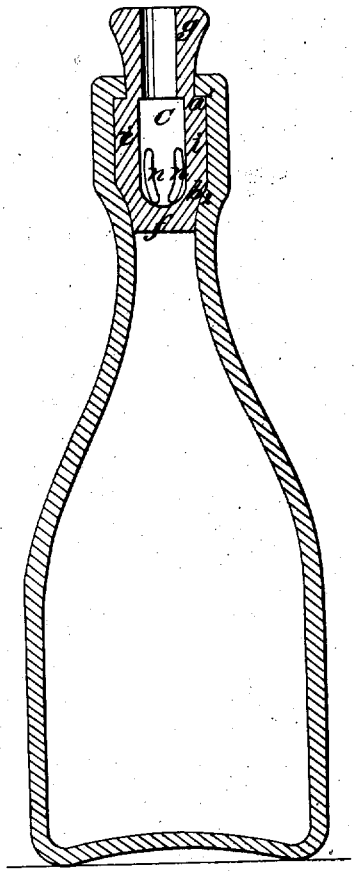
Figure 1:
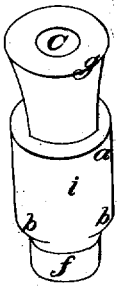

Figure 1 is a perspective view of a stopper embodying one part of my invention. Fig. 2 is a section through a bottle embodying another part of my invention, and showing the stopper inserted therein. Fig. 3 is a view of an instrument which can be employed to advantage in inserting the stopper into the bottle.

My invention has for its object to produce a stopper for bottles (or other articles which are stopped as with a cork) to take the place of the ordinary perishable stoppers of cork, wood, &c., that shall be easily inserted into the neck of the bottle and as easily withdrawn therefrom without the necessity of employing a corkscrew or other withdrawing-instrument, that shall be capable of being employed again and again an indefinite number of times, and that shall close the bottle perfectly tight, and prevent the escape of gas from within, and which at the same time cannot be thrown out of the bottle by any pressure exerted from within by its contents, such pressure serving to expand and tighten the stopper in the bottle.

My invention also has for its object the construction of a bottle or other similar receptacle in such a way as to admit of the use of such a stopper by admitting its entrance, permitting its withdrawal by force exerted from without the bottle, and preventing its discharge by pressure from the contents of the bottle; and my invention consists in constructing bottles or other similar receptacles and their stoppers substantially as herein shown and described.

To enable others skilled in the art to practice my invention, I will now describe the manner in which I have carried it into practical operation.

The stopper is made hollow, with one end open and the other closed, the latter being the one inserted. The stopper is made of vulcanized rubber, and thus, from the material and the fact that it is made hollow, it follows that it can be both extended and compressed, according to the way in which force is brought to bear upon it. By compression and extension, or either, its diameters are temporarily changed, this rendering the stopper capable of insertion and extraction past a lip, shoulder, or contraction formed at or near the mouth of the bottle, so that the stopper in its normal state may have a greater diameter beneath the said lip or shoulder than the inside measurement of said lip. The stopper has a projection or shoulder formed all around it at *a*, which, when in the bottle and subjected to pressure from within by the contents thereof, is forced against the lip, shoulder, or projection at or near the mouth of the bottle, and marked 1 in the drawings, Fig. 2. Such pressure from within tends to enlarge the diameter of the stopper, and thus, by this pressure, its ejectment is impossible, and the bottle is tightly closed by the packing of the shoulder *a* against the shoulder 1, even though the stopper should not elsewhere fit the neck of the bottle. But a stopper made hollow and of the material specified may be made to fit other parts of the neck beside the shoulder 1, its elasticity and capacity for yielding being very great, and the pressure in the bottle tending to increase the diameter of the stopper, so that will fill all parts of the bottle-neck. The upper part of the stopper is made flaring outward from the neck formed at shoulder *a*, so as to afford good hold beyond the bottle for extraction of the stopper. An opening (marked C) is formed in the stopper, which is closed at the end within the bottle by a part marked *f*, and within the opening C scores (marked *n n*) may be formed, these being indentations in the rubber designed to make the lower end of the stopper lighter and more susceptible of change of form on application of force than is the upper end. The stopper may be formed with a shoulder, *b*, extending all around it, near its lower end, as shown, which shoulder abuts against the shoulder or contraction in the bottle-neck, (marked 2.) The function of both *b* and 2 will be explained beyond.

To insert the stopper, an instrument (marked D) having a head, *h*, may be employed. By inserting it into the hole C in the stopper with its end bearing on the closed entering end *f* of the stopper, this being entered or presented at the mouth of the bottle, and by pressing on *h*, the stopper is elongated and its diameter diminished, so that those parts of the stopper normally of greater diameter than the mouth of the bottle are reduced in diameter till they are enabled to be forced past the contraction, and thus the stopper is entered. Pulling upon the part *g* of the stopper also extends its length, and of course diminishes its diameter till the large parts of the stopper are so reduced as to slip past the contraction, (marked 1) which extends wholly round the mouth of the bottle. The entrance of the stopper is facilitated by wetting it previous to the application of force. The shoulder (marked *b*) is inclined, to facilitate entrance of the stopper, as this shape acts by its inclination to compress the stopper, reducing its diameter, and thus aids the elongation in such reduction. By making this shoulder *b* inclined, as shown, I am also enabled to insert the stopper without use of the instrument D, relying wholly for reduction of the diameter by compressing the material of the stopper into its cavity by direct pressure exerted on the outer end. The shoulders (marked *a* and 1) are shown as at right angles to the axis of the bottle, as such shoulders form the tightest joint; but if inclined they would be sufficiently tight, and would facilitate the extraction of the stopper.

Were it not for the abutment of the shoulder *b* against the shoulder 2, the stopper might be forced inconveniently far by the instrument D into the neck of the bottle; and if the inside diameter of this continued to decrease for the whole length of the stopper, the instrument D might become clamped in the stopper so as to render the withdrawal of D difficult without withdrawal of the stopper; but by the introduction of the shoulder 2 in the construction of the bottle these inconveniences are avoided in the use of D.

The advantages which a stopper made of vulcanized rubber, and hollow, having around its body a shoulder, are as follows: It is perfectly impervious to air, and will not permit the smallest escape of gas. It may be drawn and repeatedly used. It may be quickly inserted by hand, dispensing with the mallet and breaker used with corks. It can be withdrawn without the use of the corkscrew or other instrument and without the necessity of perforating or otherwise injuring it. No wires or strings are required to enable it to resist pressure from within. No wax is required, as with corks, to render the stopping of the bottle impervious to air. These characteristics render its use far more economical than the use of corks; and it is particularly applicable with the bottle constructed as described, where soda, mineral waters, ale, cider, &c., are to be put up in bottles which require to be frequently refilled, and in which the stoppers must be held in place against a pressure of expansive gas within, inasmuch as the expense of frequently replacing the stoppers is saved, as well as that of the wires and strings employed, where the stoppers are corks, and the labor involved in tying and wiring.

It is obvious that the stopper and its receiving neck or socket is applicable to other articles besides bottles—such as decanters, jugs, jars, preserving-cans, &c.—it being simply necessary to form the mouth, neck, or socket of the article which is to be stopped with the shoulder 1, or the contraction at the mouth, and, if thought desirable, with the shoulder 2, making the two parts—viz., the stopper and socket—of such proportions as to be adapted for use, each with the other, to enable the stopper to resist pressure from within without being thrown out.

It is also evident that the exterior form of the stopper may be varied without departing from my invention, so long as it is made hollow, to admit of its being both compressed and elongated, and with a shoulder which packs and renders the bottle tight, and which resists pressure from within.

I claim—

1. Constructing a stopper of vulcanized rubber or its equivalent, when made hollow to facilitate changes of its diameter, and with a confining-shoulder, for the purpose specified.

2. Constructing a stopper of vulcanized rubber or its equivalent, when made with a shoulder, *a*, substantially as described, or with two shoulders, *a* and *b*.

3. Constructing the neck of a bottle or other socket which receives a stopper with a shouldered contraction, 1, which extends entirely around the socket and operates in conjunction with the stopper, substantially as described.

4. Constructing the neck of a bottle or other socket which receives a stopper with shouldered contractions 1 2, which operate in conjunction with the stopper, substantially as described.

In witness whereof I have hereunto set my hand, in the presence of two subscribing witnesses, this 6th day of October, A. D. 1863.

WILLIAM A. SHAW.

Witnesses:

J. B. CROSBY,

GEO. SHIPPEN.